US008428976B1

(12) United States Patent
Johnson et al.

(10) Patent No.: US 8,428,976 B1
(45) Date of Patent: *Apr. 23, 2013

(54) INFRASTRUCTURE METHOD AND SYSTEM FOR MANAGING DEDUCTIBLES FOR INSURANCE POLICIES

(75) Inventors: Jeromy Laverne Johnson, San Antonio, TX (US); Michael Hongmin Chan, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/978,174

(22) Filed: Dec. 23, 2010

Related U.S. Application Data

(63) Continuation of application No. 10/649,237, filed on Aug. 26, 2003, now Pat. No. 7,885,830.

(51) Int. Cl.
*G06Q 40/00* (2006.01)

(52) U.S. Cl.
USPC ..................................... 705/4; 705/2; 705/35

(58) Field of Classification Search .................. 705/2, 4, 705/26, 35, 38, 44
See application file for complete search history.

(56) References Cited

U.S. PATENT DOCUMENTS

| | | | | |
|---|---|---|---|---|
| 4,831,526 A * | 5/1989 | Luchs et al. ........................ | 705/4 |
| 5,133,068 A * | 7/1992 | Crus et al. .............................. | 1/1 |
| 5,191,522 A * | 3/1993 | Bosco et al. ........................ | 705/4 |
| 5,231,571 A * | 7/1993 | D'Agostino ................. | 705/36 R |
| 5,325,291 A * | 6/1994 | Garrett et al. ...................... | 705/4 |
| 5,655,085 A * | 8/1997 | Ryan et al. ......................... | 705/4 |
| 5,832,447 A * | 11/1998 | Rieker et al. ....................... | 705/2 |
| 5,991,733 A * | 11/1999 | Aleia et al. .................... | 705/7.13 |
| 6,061,691 A * | 5/2000 | Fox ........................................ | 1/1 |
| 6,186,793 B1 * | 2/2001 | Brubaker ....................... | 434/107 |
| 6,584,446 B1 * | 6/2003 | Buchanan et al. ................ | 705/4 |
| 6,826,594 B1 * | 11/2004 | Pettersen ...................... | 709/203 |
| 8,103,526 B1 * | 1/2012 | Pallesen et al. ................... | 705/4 |
| 8,332,241 B2 * | 12/2012 | Harrell et al. ..................... | 705/4 |
| 2001/0023404 A1 * | 9/2001 | Ogawa et al. ..................... | 705/4 |
| 2002/0049617 A1 * | 4/2002 | Lencki et al. ..................... | 705/4 |
| 2002/0055862 A1 * | 5/2002 | Jinks ................................. | 705/4 |

(Continued)

OTHER PUBLICATIONS

Health benefits costs for cos & employees: New benchmarks by region, industry, size, plan. (Jun. 2002). The Controller's Report,(6), 1,18+.*
Mark Weisbrot. (Jun. 27, 1997). Medicare cuts: courage or cowardice :[1,2,3,4,5,6,7,8 Edition]. The San Diego Union—Tribune,p. B-9:6,7,8.*

(Continued)

*Primary Examiner* — Ryan D Donlon
(74) *Attorney, Agent, or Firm* — Kilpatrick Townsend & Stockton LLP

(57) ABSTRACT

A method of determining a renewal deductible for an insurance policy includes providing a computer having a processor, determining that a default deductible is less than a current deductible, and determining that a new deductible indicator is negative. The method includes retrieving, using the processor and an available deductible key reference, a plurality of available deductibles from a third table and determining, using the processor, that the plurality of available deductibles does not include the current deductible. The method further includes setting the renewal deductible equal to the available deductible of the plurality of available deductibles higher than and closest to the current deductible if the next higher deductible indicator is in a positive state and setting the renewal deductible equal to the available deductible of the plurality of available deductibles less than and closest to the current deductible if the next higher deductible indicator is in a negative state.

20 Claims, 7 Drawing Sheets

U.S. PATENT DOCUMENTS

| | | | | |
|---|---|---|---|---|
| 2002/0156656 | A1* | 10/2002 | Harrell et al. | 705/4 |
| 2003/0083908 | A1* | 5/2003 | Steinmann | 705/4 |
| 2003/0093302 | A1* | 5/2003 | Quido et al. | 705/4 |
| 2004/0205534 | A1* | 10/2004 | Koelle | 715/507 |
| 2005/0075911 | A1* | 4/2005 | Craven, Jr. | 705/4 |
| 2005/0144114 | A1* | 6/2005 | Ruggieri et al. | 705/37 |
| 2005/0154699 | A1* | 7/2005 | Lipkin et al. | 707/1 |
| 2007/0067735 | A1* | 3/2007 | Hawley et al. | 715/792 |
| 2008/0097788 | A1* | 4/2008 | Dang | 705/2 |
| 2011/0131072 | A1* | 6/2011 | Colley et al. | 705/4 |

OTHER PUBLICATIONS

By Heather Rude Star Staff Reporter. (Jun. 14, 1990). No-fault insurance rates 'all over map,' brokers say :[Final Edition]. The Windsor Star, p. A3.*

Zolkos, Rodd "Retentions, deductibles continue rising" Business Insurance; Nov. 18, 2002, vol. 36 Issue 46, p. 37, 1/3p.*

Davis, Kristin et al., "Disaster At Your Doorstep", Kiplinger's Personal Finance; Jul. 2003, vol. 57 Issue 7, p. 62, 10p.*

* cited by examiner

Reference Database – Master Reference Table

| Company Code | Product Service Line of Business Code | State Code | System Application Code | Business Transaction Code | Reference Date | Use Policy Effective Date Indicator | Policy Deductible Surrogate Key |
|---|---|---|---|---|---|---|---|
| 0 | 6 | AR | DW | QQ | 5/1/02 | YES | 30006 |
| 0 | 6 | AR | DW | QQ | 1/1/02 | YES | 30005 |
| 0 | 6 | AR | DW | IS | 5/1/02 | YES | 30006 |
| 0 | 6 | AR | DW | IS | 1/1/02 | YES | 30005 |
| 0 | 6 | AR | DW | | 5/1/02 | YES | 30007 |
| 0 | 6 | AR | DW | | 10/1/02 | YES | 30002 |

FIG. 1

Reference Database – Policy Deductible Table 200

| Pol Ded Surr Key 116 | Cov Type Code 202 | Prop Loc Cnty Code 204 | Prop Loc Zip 206 | Roof Type Code 208 | Beg Range Amnt 210 | End Range Amnt 212 | Ded Type SHA 214 | Def Ded Amnt 216 | Def Ded Pct 218 | Stand Ded Amnt 220 | Stand Ded Pct 222 | Def Ded Year Qty 224 | Buy Down Msg Ind 226 | Avl Ded Surr Key 228 | Ovr Def Ded Ind 232 | New Def Map Ind 234 | UNC Map Ind 236 | New Ded Surr Key 230 | Next High Ded Ind 238 |
|---|---|---|---|---|---|---|---|---|---|---|---|---|---|---|---|---|---|---|---|
| 30011 | | | | | 0 | 99999 | ALL | 250 | | 500 | | | YES | 10002 | N | Y | N | 6210 | Y |
| 30007 | | | | | 100000 | 149999 | ALL | 500 | | 500 | | | YES | 10002 | Y | Y | N | 6211 | Y |
| 30007 | | | | | 150000 | 299999 | ALL | 500 | | 500 | | | YES | 10004 | N | Y | N | 6211 | Y |
| 30007 | | | | | 300000 | 599999 | ALL | 500 | | 500 | | | YES | 10005 | N | Y | N | 6211 | Y |
| 30007 | | | | | 600000 | 999999999 | ALL | 500 | | 500 | | | YES | 10005 | N | Y | N | 6211 | Y |
| 30007 | | | 1 | | 0 | 99999 | OTHER | 250 | | 500 | | | YES | 30009 | N | Y | N | 6212 | Y |
| 30007 | | | 1 | | 0 | 99999 | WH | 500 | | 500 | | | YES | 30009 | N | Y | N | 6212 | Y |
| 30007 | | | 1 | | 100000 | 149999 | OTHER | 500 | | 500 | | | YES | 30009 | Y | Y | N | 6213 | Y |
| 30007 | | | 1 | | 100000 | 149999 | WH | 500 | | 500 | | | YES | 30009 | Y | Y | N | 6213 | Y |
| 30007 | | | 1 | | 150000 | 299999 | OTHER | 500 | | 500 | | | YES | 30010 | N | Y | N | 6213 | Y |
| 30007 | | | 1 | | 150000 | 299999 | WH | 500 | | 500 | | | YES | 30011 | N | Y | N | 6213 | Y |
| 30007 | | | 1 | | 300000 | 599999 | OTHER | 500 | | 500 | | | YES | 30011 | N | Y | N | 6213 | Y |
| 30007 | | | 1 | | 300000 | 599999 | WH | 500 | | 500 | | | YES | 30011 | N | Y | N | 6213 | Y |
| 30007 | | | 1 | | 600000 | 999999999 | OTHER | 500 | | 250 | | | YES | 30009 | N | Y | N | 6212 | Y |
| 30007 | | | 1 | | 600000 | 999999999 | WH | 500 | | 500 | | | YES | 30009 | N | Y | N | 6213 | Y |
| 30007 | | | 2 | | 0 | 99999 | OTHER | 250 | | 500 | | | YES | 30009 | Y | Y | N | 6213 | Y |
| 30007 | | | 2 | | 0 | 99999 | WH | 500 | | 500 | | | YES | 30010 | Y | Y | N | 6213 | Y |
| 30007 | | | 2 | | 100000 | 149999 | OTHER | 500 | | 500 | | | YES | 30010 | N | Y | N | 6213 | Y |
| 30007 | | | 2 | | 100000 | 149999 | WH | 500 | | 500 | | | YES | 30011 | N | Y | N | 6213 | Y |
| 30007 | | | 2 | | 150000 | 299999 | OTHER | 500 | | 500 | | | YES | 30011 | N | Y | N | 6213 | Y |
| 30007 | | | 2 | | 150000 | 299999 | WH | 500 | | 500 | | | YES | 30011 | N | Y | N | 6213 | Y |
| 30007 | | | 2 | | 300000 | 599999 | OTHER | 500 | | 500 | | | YES | 30011 | N | Y | N | 6213 | Y |
| 30007 | | | 2 | | 300000 | 599999 | WH | 500 | | 500 | | | YES | 30011 | N | Y | N | 6213 | Y |
| 30007 | | | 2 | | 600000 | 999999999 | OTHER | 500 | | 500 | | | YES | 30011 | N | Y | N | 6213 | Y |
| 30007 | | | 2 | | 600000 | 999999999 | WH | 500 | | 500 | | | YES | 30009 | N | Y | N | 6213 | Y |
| 30007 | | | 4 | | 0 | 99999 | OTHER | 250 | | 500 | | | YES | 30009 | N | Y | N | 6212 | Y |

FIG. 2

Reference Database – Available Deductible Table ⟵ 300

| Available Deductible Surrogate Key ⟵ 228 | Available All/Other Deductible Amount ⟵ 302 | Available All/Other Deductible Percent ⟵ 304 | Available Wind and Hail/ Hurricane Deductible Amount ⟵ 306 | Available Wind and Hail/ Hurricane Deductible Percent ⟵ 308 |
|---|---|---|---|---|
| 30011 |  | 0.01 |  | 0.01 |
| 30011 |  | 0.01 |  | 0.02 |
| 30011 |  | 0.02 |  | 0.02 |
| 30011 | 100 |  | 100 |  |
| 30011 | 250 |  | 250 |  |
| 30011 | 500 |  |  | 0.01 |
| 30011 | 500 |  |  | 0.02 |
| 30011 | 500 |  | 500 |  |
| 30011 | 1000 |  |  | 0.01 |
| 30011 | 1000 |  |  | 0.02 |
| 30011 | 1000 |  | 1000 |  |
| 30011 | 2500 |  |  | 0.01 |
| 30011 | 2500 |  |  | 0.02 |
| 30011 | 2500 |  | 2500 |  |

FIG. 3

Reference Database – New Deductible Table

| New Deductible Surrogate Key (230) | Available All/Other Deductible Amount (402) | Available All/Other Deductible Percent (404) | Available Wind and Hail/Hurricane Deductible Amount (406) | Available Wind and Hail/Hurricane Deductible Percent (408) | New All/Other Deductible Amount (410) | New All/Other Deductible Percent (412) | New Wind and Hail/Hurricane Deductible Amount (414) | New Wind and Hail/Hurricane Deductible Percent (416) |
|---|---|---|---|---|---|---|---|---|
| 6213 | | | 100 | | | | | |
| 6213 | | | 250 | | | | | |
| 6213 | | | 500 | | | | | |
| 6213 | | | 1000 | | | | | |
| 6213 | | | 2500 | | | | | |
| 6213 | 100 | | | | 500 | | 500 | |
| 6213 | 250 | | | | 500 | | 500 | |
| 6213 | 500 | | | | 500 | | 1000 | |
| 6213 | 1000 | | | | 1000 | | 250 | |
| 6213 | 2500 | | | | 2500 | | | |

*FIG. 4*

INFRASTRUCTURE METHOD AND SYSTEM FOR MANAGING DEDUCTIBLES FOR INSURANCE POLICIES

CROSS-REFERENCES TO RELATED APPLICATIONS

This application is a continuation of U.S. patent application Ser. No. 10/649,237, filed on Aug. 26, 2003, the disclosure of which is hereby incorporated by reference in its entirety for all purposes.

BACKGROUND OF THE INVENTION

The disclosure herein relates generally to formulating insurance policy deductibles and more particularly to controlling and applying a structure for deductibles for new and renewal policies.

Historically, deductible options vary from state to state, and often do not include special peril deductibles (hurricane, wind/hail) that would be helpful in improving risk mitigation efforts in catastrophe prone areas. An infrastructure that controls the availability, migration and management of deductibles will allow the insurer to implement deductible adjustments using a number of variables, and implement them in the most efficient time and cost effective manner.

Therefore, what is needed is a deductible infrastructure that facilitates the implementation of risk management programs, in order to manage an insurer's catastrophe exposure and minimize the risk of adverse financial impact while continuing to service insured parties in highly exposed areas.

SUMMARY OF THE INVENTION

One embodiment, accordingly, provides for a method and system for managing deductibles for insurance policies. A plurality of interrelated tables are provided, each of which include a plurality of variables. A first key reference is provided in one table to identify a specific group of the variables. The first key reference is matched to another table to identify a second specific group of variables and a plurality of additional key references. The plurality of additional key references are matched to a plurality of respective additional tables to determine a deductible for a related policy.

A principal advantage of this embodiment is that risk sharing is increased between the insurer and the insured. Deductible adjustments are implemented using multiple variables in the most time efficient and cost effective manner. This embodiment may be applied to various types of insurance coverage.

BRIEF DESCRIPTION OF THE DRAWINGS

FIG. 1 is a table illustrating an embodiment of a master reference structure.

FIG. 2 is a table illustrating an embodiment of a policy deductible structure.

FIG. 3 is a table illustrating an embodiment of an available deductible structure.

FIG. 4 is a table illustrating an embodiment of a new deductible structure.

DETAILED DESCRIPTION OF SPECIFIC EMBODIMENTS

Figure 5:
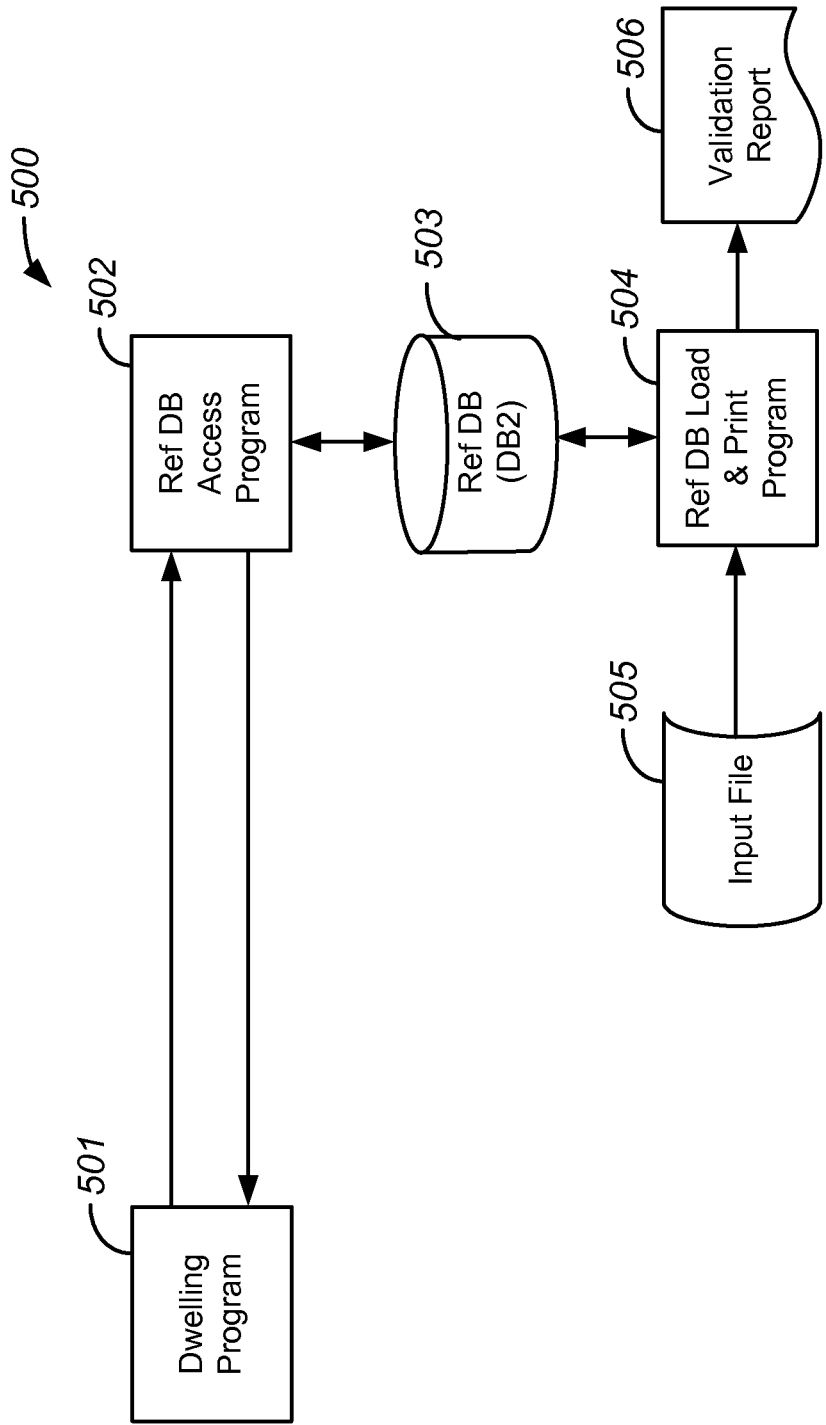
FIG. 5 is a flow chart illustrating an embodiment of a deductible infrastructure system overview.

The deductible or deductible combination for each policy is driven by a series of tables each including vertical rows or columns and horizontal lines. These tables are based on matching the policy characteristics or variables to those listed in the tables. Identification of a given variable in these tables is all inclusive unless otherwise identified. For example, for a residence or structure, roof type is a variable in the table, but not all roof types are listed. The absence of a roof type indicates all possible roof types follow that line entry. This allows the table to handle all possibilities without entering every possibility; only the exceptions. However for some variables, every possibility will be included, i.e., AOI (Amount of Insurance) to ensure completeness.

The base table is the master reference table 100, FIG. 1, which allows deductibles to be managed based on a code for a Company 102 (official insurance company name), Line of Business 104, State 106, Application 108, Transaction Type 110 (quote, new business, renewal . . . ), Date reference for changes 112, Policy Effective or Written Date 114, and a Key 116 to match to a policy deductible table 200, FIG. 2.

The main function of the master reference table 100 is to control an initial placement based on a geographical location, such as a state or a part of a state, and also based on a transaction, such as a new or a renewal policy, and with regard to the effective date of the policy.

The policy deductible table 200 is the primary control table. It includes the Match Key 116 from the master reference table 100, the Coverage Type Code 202 for different policy forms, a County/Zip combination 204, 206 for location variances, Roof Type 208, Beginning and End Ranges for AOI 210, 212, and sections to control the Deductible Type and Amounts. These sections identify the deductible type 214, the default deductible amount 216 and default percentage 218, and the base or standard deductible amount 220 and standard percentage 222. The structure will allow the current deductibles at renewal to continually increase (roll-up) or renew the policy at the default amount/percentage every year for up to 99 years 224. Although a typical roll-up would occur only once, the capability is still available. The table 200 includes links to additional tables (discussed below). One is to identify the available deductibles 228 for policies meeting the selected criteria called the available deductible table (discussed below). The other 230 links to the new deductible table (also discussed below) which details the migration from the current deductible to a new renewal deductible in a situation like a roll-up or the elimination of a deductible amount/percentage.

The policy deductible table 200 also sets an indicator 226 to post a message on the Dwelling System based on the type of program or suggestion for other coverage available. Other indicators include an indicator 232 to increase the renewal deductible to the default amount/percentage when the policies AOI increases from one range to another, an indicator 234 to identify migration from a current deductible to a new deductible amount/percentage, an indicator 236 for unconditional mapping based on a decision to map all deductibles to "X" amount/percentage, and an indicator 238 to indicate which deductible to apply if the current renewal amount/percentage is no longer available at renewal and is not set in the new deductible table, i.e., next higher amount/percentage or next lower amount/percentage. The indicator 238 is a failsafe feature that includes the ability to identify the next higher/lower deductible using amounts and percentages. It will calculate the percentage amount based on the current AOI and compare to the other available amounts before choosing the next higher or lower deductible.

The policy deductible table 200 is the overall controlling table for each variable used to distinguish both the available, or old, deductibles and the new deductibles when changes to the deductibles are required, i.e., when the deductibles are eliminated, increased or decreased.

The available deductible table 300 includes the match key 228 and all possible deductible combinations to include all other perils amounts 302 and percentages 304. The attached example also displays split Wind/Hail deductible combinations for a high AOI range to include amounts 306 and percentages 308. This table allows the insurer to limit the combinations available for each line entry. Although not practical, each fine entry in the policy deductible table 200 could have a corresponding available deductible table 300. As this infrastructure or any deductible program change is implemented, old/current deductibles could be eliminated. As those are eliminated, it must be replaced and renewed with a new amount/percentage.

The available deductible table 300 distinguishes the deductible available to those policies identified through their key reference numbers in the master reference table 100 and the policy deductible table 200.

The new deductible table 400 displays the migration from old to new. The table 400 includes the match key 230 and displays each of the old deductible types for all other perils including an amount 402 and a percentage 404. The table 400 also specifies the old deductible for wind and hail/hurricane including an amount 406 and a percentage 408. The table also displays each of the new deductible types for all other perils including an amount 410 and a percentage 412. The table 400 further specifies new deductible types for wind and hail/hurricane including an amount 414 and a percentage 416. Old deductible types are identified as "Available" and the new renewal deductible types are identified as "New". Every possible deductible is included and has a corresponding "New"; even if they are equal.

The new deductible table 400 identifies movement from the available, or old, deductible to a new deductible.

These tables are driven by a process flow that links the Dwelling System to the resulting deductible that is applied to the policy. The attached process flow and table structure controls a tremendous number of possibilities with a few short steps.

The Deductible Infrastructure—System Overview 500, FIG. 5, is an overview of the deductible database and its interaction with a dwelling application system and input and output programs. A policy system 501 displays the system that issues, renews, or modifies property policies. An interface 502 is a program that allows the policy system 501 to interact with a deductible database 503, which contains the tables 100, 200, 300 and 400 in FIGS. 1-4. An interface program 504 interacts with the deductible database 503 to input table changes at 505 and track and report those changes at 506.

Figure 6:
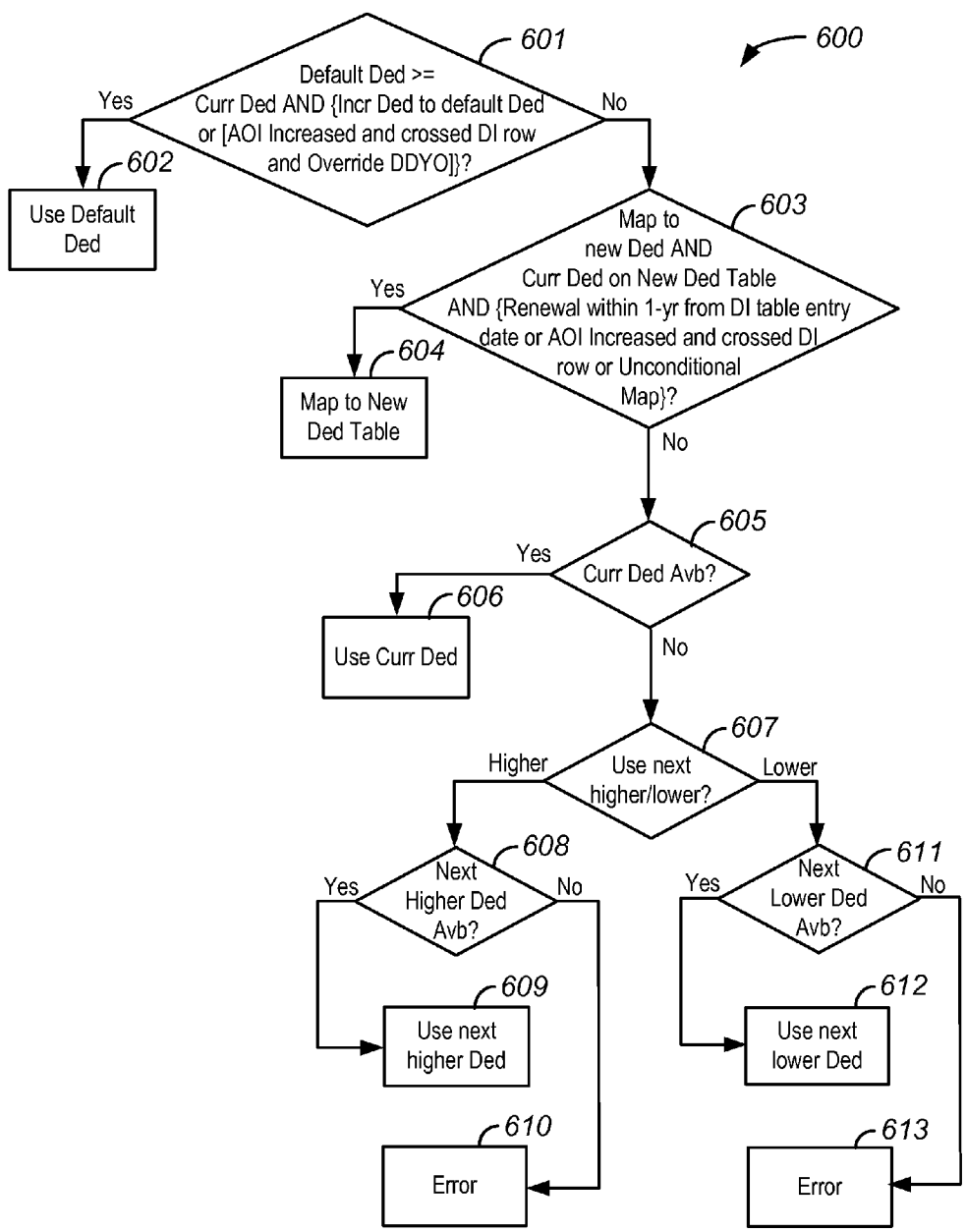
FIG. 6 is a flow chart illustrating an embodiment of a renewal processing logic diagram.

The Deductible Infrastructure—Renewal Processing Logic Diagram 600, FIG. 6, is the logic that the program uses to distinguish the line entries for the tables in FIGS. 1-4. A logic decision 601 uses the variables identified in FIG. 2 to determine if the conditions are met or not met. If the conditions are met, then the logic would direct them to be used at 602, and the default deductible used will be found at 216 and 218, FIG. 2. If the conditions are not met, then logic 603 uses the variables identified in FIG. 2, but not 216 and 218. If the conditions of 603 are met, the new deductible 604 uses the reference key at 230 to define the new deductible. If the conditions of 603 are not met, it is determined at 605 if the current deductible is available. If the deductible is available, that deductible is used at 606. If the current deductible is not available, then logic 607 uses variables found in 238 to determine the next highest or lowest deductible. If 238 is identified as Yes or higher, then logic 608 determines whether or not the next highest deductible is available. If the next highest deductible is available at 609, that deductible is used. If the deductible is not available, the policy will stop at 610 and human intervention will be required to determine the deductible. If 238 is identified as No or lower, then logic 611 determines whether or not the next lowest deductible is available. If the next lowest deductible is available at 612, that deductible is used. If the deductible is not available, the policy will stop at 613 and human intervention will be required to determine the deductible.

Figure 7:
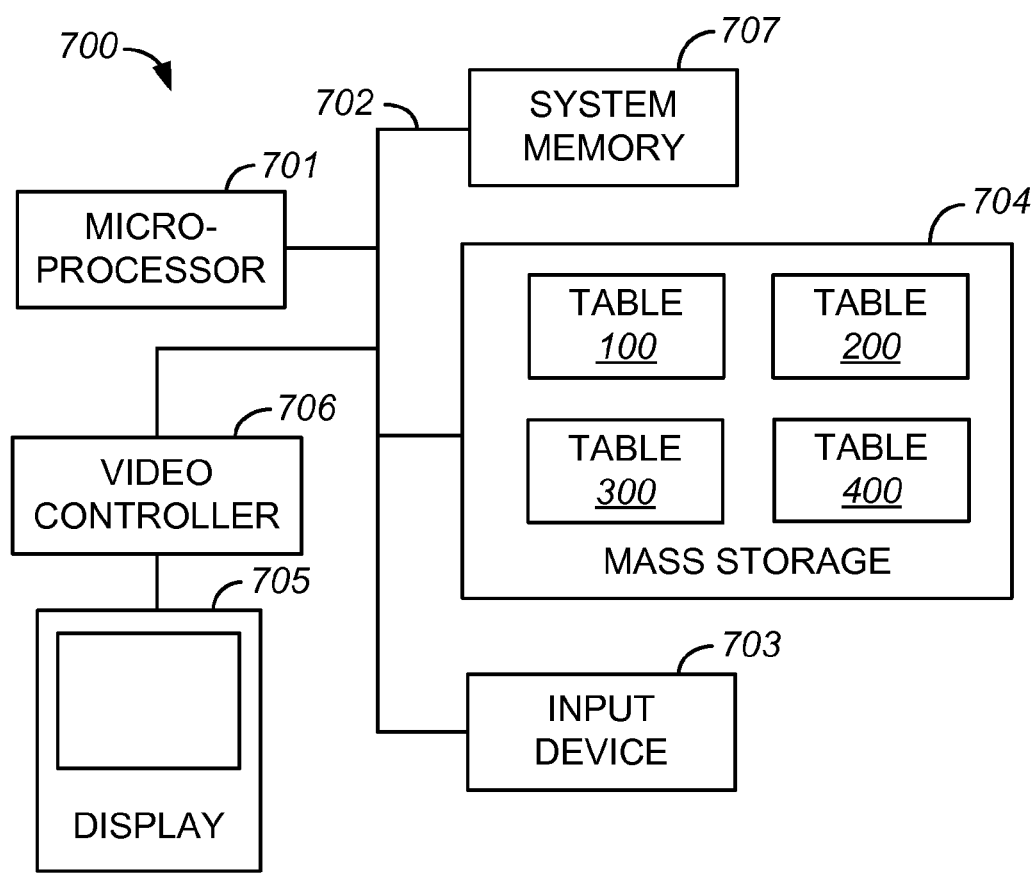
FIG. 7 is an embodiment of an information handling system used to manage and process deductible data.

In one embodiment, an information handling system such as a computer system 700, FIG. 7, may be used to manage deductibles. The computer system 700 includes a microprocessor 701, which is connected to a bus 702. Bus 702 serves as a connection between microprocessor 701 and other components of computer system 700. An input device 703 is coupled to microprocessor 701 to provide input to microprocessor 701. Examples of input devices include keyboards, touchscreens, and pointing devices such as mouses, trackballs and trackpads. Programs and data are stored on a mass storage device 704, which is coupled to microprocessor 701. Mass storage devices include such devices as hard disks, optical disks, magneto-optical drives, floppy drives and the like. Computer system 700 further includes a display 705, which is coupled to microprocessor 701 by a video controller 706. A system memory 707 is coupled to microprocessor 701 to provide the microprocessor with fast storage to facilitate execution of computer programs by microprocessor 701. It should be understood that other busses and intermediate circuits can be deployed between the components described above and microprocessor 701 to facilitate interconnection between the components and the microprocessor. The tables 100, 200, 300 and 400, mentioned above, and containing the variables to be managed and processed, are in the storage 704 to be processed by the processor 701.

The above-described method and system are not for use by customers, i.e., insured parties, but are internal tools used by the insurer for servicing the customers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of determining a renewal deductible for an insurance policy, the method comprising:
   providing a computer having a processor;
   providing a plurality of interrelated tables, each table of the plurality of interrelated tables including a plurality of policy variables;
   extracting, using the processor, a first key reference from a first table, the first key reference identifying a first specific group of the policy variables;
   retrieving a current deductible associated with the insurance policy;

matching, using the processor, the first key reference to a second table including a default deductible, a new deductible indicator having either a positive state or a negative state, an available deductible key reference, and a next higher deductible indicator having either a positive or a negative state;

retrieving, using the processor, the default deductible, the new deductible indicator, and the next higher deductible indicator from the second table;

determining, using the processor, that the default deductible is less than the current deductible;

determining, using the processor, that the new deductible indicator is in the negative state;

retrieving, using the processor and the available deductible key reference, a plurality of available deductibles from a third table;

determining, using the processor, that the plurality of available deductibles does not include the current deductible;

setting the renewal deductible equal to the available deductible of the plurality of available deductibles higher than and closest to the current deductible if the next higher deductible indicator is in a positive state; and setting the renewal deductible equal to the available deductible of the plurality of available deductibles less than and closest to the current deductible if the next higher deductible indicator is in a negative state.

2. The method of claim 1 wherein the first table further includes a geographical variable.

3. The method of claim 2 wherein the first table further includes a transaction variable and an effective policy date variable.

4. The method of claim 1 wherein the second table further includes a first deductible variable and a second deductible variable.

5. The method of claim 4 further comprising providing variables distinguishing deductibles available to the policies.

6. The method of claim 1 further comprising generating an error code if no available deductible of the plurality of available deductibles is higher than and closest to the current deductible.

7. The method of claim 1 further comprising generating an error code if no available deductible of the plurality of available deductibles is less than and closest to the current deductible.

8. A non-transitory computer-readable medium comprising a plurality of instructions, which, when executed by a processor, cause the processor to determine a renewal deductible for an insurance policy, the plurality of instructions comprising:

instructions that cause the data processor to extract a first key reference from a first table of a plurality of interrelated tables, the first key reference identifying a first specific group of policy variables;

instructions that cause the data processor to retrieve a current deductible associated with the insurance policy;

instructions that cause the data processor to match the first key reference to a second table including a default deductible, a new deductible indicator having either a positive state or a negative state, an available deductible key reference, and a next higher deductible indicator having either a positive or a negative state;

instructions that cause the data processor to retrieve the default deductible, the new deductible indicator, and the next higher deductible indicator from the second table;

instructions that cause the data processor to determine that the default deductible is less than the current deductible;

instructions that cause the data processor to determine that the new deductible indicator is in the negative state;

instructions that cause the data processor to retrieve, using the available deductible key reference, a plurality of available deductibles from a third table;

instructions that cause the data processor to determine that the plurality of available deductibles does not include the current deductible;

instructions that cause the data processor to set the renewal deductible equal to the available deductible of the plurality of available deductibles higher than and closest to the current deductible if the next higher deductible indicator is in a positive state; and instructions that cause the data processor to set the renewal deductible equal to the available deductible of the plurality of available deductibles less than and closest to the current deductible if the next higher deductible indicator is in a negative state.

9. The non-transitory computer-readable medium of claim 8 wherein the first table further includes a geographical variable.

10. The non-transitory computer-readable medium of claim 9 wherein the first table further includes a transaction variable and an effective policy date variable.

11. The non-transitory computer-readable medium of claim 8 wherein the second table further includes a first deductible variable and a second deductible variable.

12. The non-transitory computer-readable medium of claim 11 further comprising instructions that cause the data processor to provide variables distinguishing deductibles available to the policies.

13. The non-transitory computer-readable medium of claim 8 further comprising instructions that cause the data processor to generate an error code if no available deductible of the plurality of available deductibles is higher than and closest to the current deductible.

14. The non-transitory computer-readable medium of claim 8 further comprising instructions that cause the data processor to generate an error code if no available deductible of the plurality of available deductibles is less than and closest to the current deductible.

15. An information handling system for determining a renewal deductible for an insurance policy, the information handling system comprising:

a storage device storing a program;

a processor coupled to the storage device and operative with the program for processing data in a plurality of interrelated tables, wherein the processor is operable to execute instructions of the program, the instructions comprising:

extracting, using the processor, a first key reference from a first table;

retrieving a current deductible associated with the insurance policy;

matching, using the processor, the first key reference to a second table including a default deductible, a new deductible indicator having either a positive state or a negative state, an available deductible key reference, and a next higher deductible indicator having either a positive or a negative state;

retrieving, using the processor, the default deductible, the new deductible indicator, and the next higher deductible indicator from the second table;

determining, using the processor, that the default deductible is less than the current deductible;

determining, using the processor, that the new deductible indicator is in the negative state;

retrieving, using the processor and the available deductible key reference, a plurality of available deductibles from a third table;

determining, using the processor, that the plurality of available deductibles does not include the current deductible;

setting the renewal deductible equal to the available deductible of the plurality of available deductibles higher than and closest to the current deductible if the next higher deductible indicator is in a positive state; and setting the renewal deductible equal to the available deductible of the plurality of available deductibles less than and closest to the current deductible if the next higher deductible indicator is in a negative state.

16. The information handling system of claim 15 wherein the first table further includes a geographical variable.

17. The information handling system of claim 16 wherein the first table further includes a transaction variable and an effective policy date variable.

18. The information handling system of claim 15 wherein the second table further includes a first deductible variable and a second deductible variable.

19. The information handling system of claim 15 further comprising generating an error code if no available deductible of the plurality of available deductibles is higher than and closest to the current deductible.

20. The information handling system of claim 15 further comprising generating an error code if no available deductible of the plurality of available deductibles is less than and closest to the current deductible.

* * * * *